United States Patent [19]

Ritter et al.

[11] 4,101,081
[45] Jul. 18, 1978

[54] HAY LOADING, TRANSPORTING AND FEEDING SYSTEM

[75] Inventors: Orville A. Ritter; Dale H. Ritter, both of Alva, Okla.

[73] Assignee: Ritter Brothers Enterprises, Inc., Alva, Okla.

[21] Appl. No.: 777,566

[22] Filed: Mar. 14, 1977

[51] Int. Cl.² .......................................... B02C 13/286
[52] U.S. Cl. ................................ 241/101.7; 214/80; 214/518; 214/519; 241/282
[58] Field of Search ............... 241/101 A, 101.7, 280, 241/282; 214/80, 83.14, 83.36, 505, 508, 518, 519, DIG. 4; 198/692, 693, 841

[56] References Cited

U.S. PATENT DOCUMENTS

| | | | |
|---|---|---|---|
| 3,559,898 | 2/1971 | Rinke | 241/282 X |
| 3,575,310 | 4/1971 | Albertson | 198/692 X |
| 3,863,850 | 2/1975 | Freeman | 241/101.7 X |
| 3,884,367 | 5/1975 | Butler et al. | 214/518 X |
| 3,924,765 | 12/1975 | Hostetler | 214/518 |
| 3,999,674 | 12/1976 | Meitl | 214/508 X |

FOREIGN PATENT DOCUMENTS

2,332,085  1/1975  Fed. Rep. of Germany ....... 214/519

Primary Examiner—Roy Lake
Assistant Examiner—Howard N. Goldberg
Attorney, Agent, or Firm—William R. Laney

[57] ABSTRACT

A system for loading, transporting and feeding hay comprising an automotive vehicle including a rearwardly extending bed, contoured bale-retaining fences located at opposite sides of said bed, a rearwardly extending bed extension pivotally connected to the rear end of said bed for pivotal movement about a horizontal axis, a bale moving conveyor extending from the front of said bed to the rear end of said bed extension, a lateral bale pick-up cradle assembly pivotally mounted on one side of said bed adjacent the forward end thereof and pivotable about a horizontal axis, a bale cutting and disintegrating assembly mounted adjacent the forward end of said bed for receiving hay moved on said bed by said bale moving conveyor and a reciprocating, foldable pusher plate assembly mounted on one of said contoured fences over said bed for pushing bales into said bale cutting and disintegrating assembly.

27 Claims, 10 Drawing Figures

HAY LOADING, TRANSPORTING AND FEEDING SYSTEM

BACKGROUND OF THE INVENTION

1. Field of the Invention

This invention relates to apparatus for picking up and transporting hay bales, and for cutting up or disintegrating such hay bales to facilitate feeding of the hay to livestock.

2. Brief Description of the Prior Art

In recent years, the long-used practice of forming hay bales in a right parallelepiped configuration using wire has undergone a transformation so that, at present, the baling of hay is carried out, on an increasing scale, by forming relatively large cylindrical bales having twine wrapped around the bales sufficiently to retain them in their cylindrical configuration. Such bales are often formed with a crown at one end thereof which permits them to shed water so that the bales can be left in the field, and are not penetrated by rain to a degree such that the bales rot and the hay becomes sour or unpalatable. The cylindrical bales as thus formed have required the manufacture of entirely different types of hay baling machines from those traditionally used in the formation of the relatively small rectangular bales. Moreover, the large cylindrical bales, in weighing from 10 to 15 times as much as the rectangular bales, have presented new problems of picking up such bales in the field and transporting them to a storage or feeding location. Many structures and devices have been recently proposed for accomplishing such pick-up and transport of these bales.

In U.S. Pat. No. 3,924,765, a hydraulic side lift loader in the form of a trailer adapted to be pulled behind a towing vehicle is disclosed. In this instance, the wheeled loader is driven alongside a bale to be lifted up and a cradle or frame is then passed around the cylindrical bale, after which it is lifted by pivoting this cradle or frame upwardly to deposit the bale upon the bed of the wheeled trailer. A conveyor is mounted on the trailer bed for the purpose of longitudinally moving the bale on the bed to remove the bale from the trailer after it has been transported by a towed vehicle to an unloading location.

In U.S. Pat. No. 3,863,850, a bale shredder and discharger mounted upon a towed trailer are disclosed, with the trailer carrying ground-engaging wheels and having a longitudinally extending conveyor along the bed thereof. The conveyor functions to move bales to the forward end of the trailer bed where a cutting and shredding system is provided for disintegrating the hay bale, and permitting the disintegrated hay to be discharged on a cross-conveyor to one side or other of the trailer in order to feed stock after the bale has been transported to a feeding location. Such lateral discharge of ground feed by means of a cross-conveyor is also disclosed in Mohrlang et al. U.S. Pat. No. 2,694,499.

U.S. Pat. No. 3,926,378 to Ryan describes a trailer vehicle which is adapted to pick up a hay stack bodily for transport to a different location by tilting the trailer bed downwardly, and then maneuvering the trailer by a tractor so that the lower end of the trailer is wedged partially under one end of the hay stack. A conveyor on the trailer bed is then activated to draw the stack up onto the trailer bed. The conveyor is reversible and can be operated in reverse fashion to discharge or off-load the hay bale. The Ryan patent further discloses the concept of providing, on a trailer of this type, a chopping apparatus at the forward end of the conveyor which chops or disintegrates the hay bale into short lengths for discharge in a form most suited for consumption by cattle. Ryan U.S. Pat. No. 3,972,484 also shows a generally similar structure.

GENERAL DESCRIPTION OF THE PRESENT INVENTION

The present invention is a hay loading, transporting and feeding system which permits hay to be picked up from the ground in the field from either the rear, or to the side, of a vehicle adapted to transport the baled hay, which vehicle includes means for feeding the hay bales into a disintegrating assembly carried on the vehicle. The system also includes means permitting bales to be discharged as whole bales to the rear of the vehicle.

Broadly described, the hay loading, transporting and feeding system of the invention comprises an elongated bed which has a forward end and a rear end and is supported on ground-engaging wheels. The bed and wheels may together constitute a trailer adapted to be towed by a suitable towing vehicle, or it may be a part of an automotive vehicle with a cab and engine forming a part of the vehicle, and positioned ahead of the elongated bed. At the rear end of the bed, a rearwardly extending bed extension is pivotally connected to the bed for pivotal movement about a horizontal axis, so that the rearward extension can pivot downwardly into a ramp which can be used, in conjunction with a conveyor included in the system, for picking up and moving large cylindrical bales of hay up onto the elongated bed. The conveyor which is utilized for this purpose is an elongated endless conveyor which is supported on the bed and the bed extension, and extends from the forward end of the bed to the rear end of the bed extension. The conveyor includes a portion mounted on the bed extension which is movable with the bed extension during pivotal movement thereof, and, in a preferred embodiment of the invention, the bale moving conveyor is reversible so that it can be moved in a direction to force bales of hay toward the forward end of the bed, or to move bales toward the rear end of the bed extension. This structure, in conjunction with a lateral bale pick-up cradle assembly which is pivotally mounted on one side of the elongated bed, preferably near the forward end thereof, enables full loading of both the bed and the bed extension when the latter structure is in horizontal alignment with the elongated bed. The lateral bale pick-up cradle assembly is mounted for pivotal movement about a horizontal axis at the side of the bed, so that it can be pivoted from a generally vertically extending position in which it is above one side of the bed, to a position extending downwardly and outwardly from one side of the bed, in which position it is oriented for picking up cylindrical bales resting upon the ground. A bale cutting and disintegrating assembly is mounted at or adjacent the forward end of the bed for receiving a bale of hay moved forwardly on the bed by the conveyor.

In a preferred embodiment of the invention, the system further includes a reciprocating, foldable pusher plate assembly which is mounted at one side of the bed, and is automatically actuatable to extend a pusher plate transversely across the bed and above the conveyor, and to then reciprocate the pusher plate in the direction of movement of the conveyor so as to aid the conveyor in feeding the baled hay into the cutting and disintegrating assembly. A preferred embodiment of the system further includes contoured fences which are positioned at opposite site sides of the bed and the bed extension for cradling and centrally positioning hay bales on the bed and bed extension, and thereby preventing them from being jostled off the bed during transport of the hay bales.

From the foregoing description of the invention, it will be perceived that a highly versatile, very useful system for loading, transporting and feeding large cylindrical bales of hay is constituted and provided by the structure of the invention. The heaviest of presently constructed bales can be handled by the system is virtually any manipulative operation currently practiced in removing hay from the field where it is initially baled to a location of storage, or to a location for feeding of livestock.

An important advantage of the invention is the provision of a system which can pick up from two different locations alongside the system, and particularly, alongside an automotive vehicle in which the system is preferably incorporated, large cylindrical bales of hay resting upon the ground, followed by the emplacement of such lifted bales in a transport position on a bed constituting a part of the system.

Another advantage of the invention is the ability to use the hay pick-up and transport system of the invention to disintegrate and chop up the hay at an ultimate location after transport, and feed it into a windrow to maintain and feed livestock.

A further object of the invention is to provide a hay loading, transporting and feeding system which can carry a plurality of large cylindrical hay bales, and can discharge such hay bales at either the forward or the rear end of the system.

Another object of the invention is to provide a relatively easily constructed and strong, mechanically durable system for loading, transporting and feeding hay.

Additional objects and advantages of the invention will become apparent as the following detailed description of a preferred embodiment of the invention is read in conjunction with the accompanying drawings which illustrate such preferred embodiment.

DETAILED DESCRIPTION OF PREFERRED EMBODIMENTS OF THE INVENTION

Figure 1:
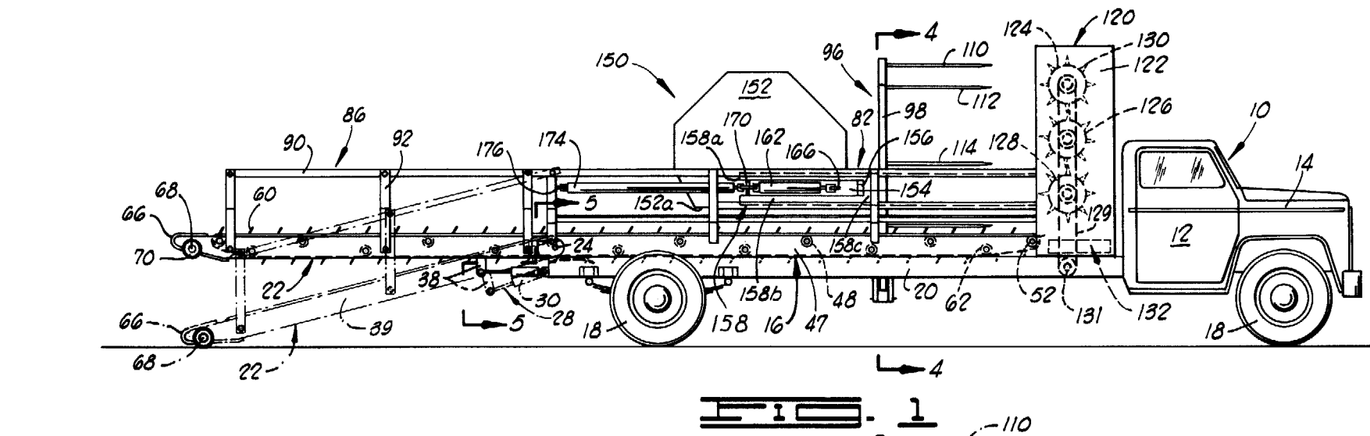
FIG. 1 is a side elevation view of the hay loading, transporting and feeding system of the invention, as the same is incorporated in an automotive vehicular embodiment. The system is illustrated with a portion of the apparatus shown in one operative position, as portrayed by the dashed lines, and in another operative position, as shown in solid lines.

Referring to FIG. 1 of the drawings, one embodiment of the hay loading, transporting and feeding system of the invention is there illustrated in side elevation. The system, as incorporated in this embodiment, includes an automotive vehicle, and more particularly a truck 10, which includes a cab 12 having an engine mounted within the hood 14 ahead of the cab, and an elongated bed 16 extending rearwardly from the cab. The bed 16 has a forward end and a rear end, and the bed and its associated cab 12 and hood 14 are all mounted upon an appropriate chassis carried on a plurality of ground-engaging wheels 18. The bed 16 of the truck 10 includes opposite sides extending substantially parallel between the front and rear of the bed, and is supported upon structural frame members 20. An elongated bed extension 22 is pivotally connected to the rear of the bed 16 for pivotal movement about a horizontal axis as hereinafter described. As illustrated in FIG. 1, the bed extension 22 can be pivoted between a horizontally extending position, in which it is in substantially planar alignment with the bed 16, and a lowered position in which it extends downwardly and rearwardly from the bed 16 and forms a ramp extending to the ground in the manner shown in dashed lines in FIG. 1.

In order to pivotally support the bed extension 22 on the rear end of the bed 16, a transversely extending pivot pin 24 is utilized for pinning frame member ear extensions 25 of the bed extension to the bed 16 (see FIGS. 1 and 6), and a pair of interconnected hydraulic piston and cylinder assemblies 26 and 28 are employed by connecting one end of the cylinder 30 thereof to a pivotal connection at a lug 32 carried on a transverse member 34 of the bed, and by pivotally connecting the piston rods 36 thereof, by means of a cylinder assembly connection pin 37, between downwardly extending bracket plates 38 secured to the lower side of frame members 39 of the bed extension 22.

For the purpose of moving hay bales along the bed 16 and bed extension 22, an elongated endless conveyor 40 is utilized in the illustrated embodiment. The conveyor 40 includes a pair of substantially parallel endless chains 42 and 44, which chains each include an upper run and a lower run, these being denominated by reference numerals 42a and 44a, and 42b, and 44b, respectively. The upper runs 42a and 44a of each of the chains are slidingly mounted upon a series of longitudinally spaced plates 46 which are welded to the inner side of elongated plates 47 secured to the upper side of the frame members 20 of the bed, and constitute tracks for the support and guidance of the upper run of each of the chains during movement of the conveyor. Spaced along the bed and bed extension in positions between the plates 46 are a series of sprockets 48 which are mounted on suitable shafts 50 extended between the plates 48. At the forward end of the conveyor 40, a pair of drive sprockets 52 are provided, and are reversibly driven by means of a suitable chain or belt drive connected to a reversible hydraulic motor (not shown) which can be operated from the cab 12 of the truck 10. Alternatively, the drive sprockets 52 can be driven by a suitable chain or belt connection through a clutch to the transmission system of the truck.

Figure 5:
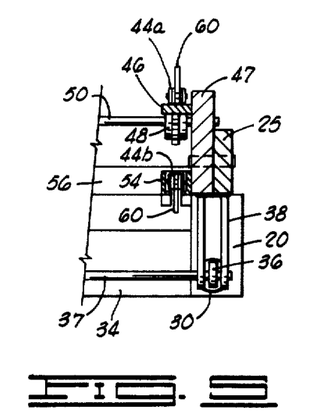
FIG. 5 is a sectional view taking along line 5—5 of FIG. 1 and illustrating certain details of the structure of a conveyor forming a part of the system of the invention.

The lower runs 42b and 44b of the chains 42 and 44 are each extended through a guiding and supporting channel member 54, with each channel member being welded to the inner side of the lower portion of one of the plates 48 in the manner illustrated in FIG. 5, and further supported by a pair of transverse cross members 56 which extend between the channel members across the bed 16. It will be noted in referring to FIG. 6 that the channel member 54 located on the left rear side of the bed 16 is disposed adjacent the rear end of the bed so as to feed the lower run 44b of the chain 44 onto the bed extension 22 adjacent the point where the extension is pivotally connected to the bed. It will also be noted in referring to FIG. 6 that the opposite ends of the channel member 54 are bent or curved so as to avoid any obstruction to the passage of the lower run of the chain into and through the channel member. The channel member 54 on the right side of the bed 16 is identically constructed.

Figure 6:
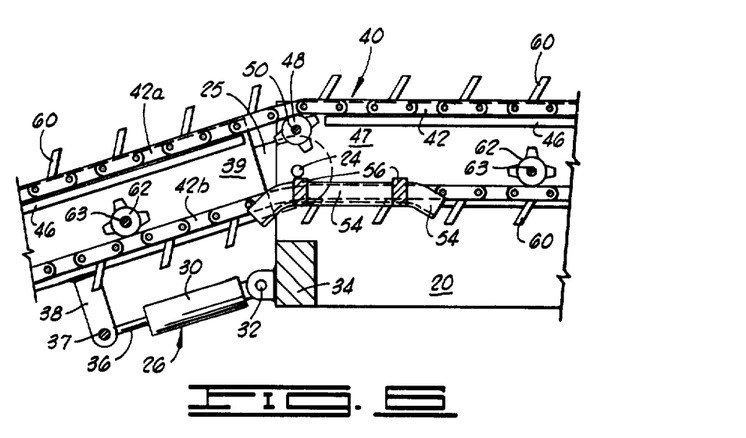
FIG. 6 is a side elevational view, with one structural member shown in section, illustrating a portion of the conveyor used in the system of the invention.

In referring to FIGS. 5 and 6, it will be noted that a plurality of tines or spikes 60, which are spaced along, and secured to, the links of the chain 44, are positioned in reference to the chain links so that the tines can pass through slots formed in the lower sides of the channels 54 as the lower runs of the chains move therethrough. In order to maintain an appropriate degree of tension in each of the chains 42 and 44, a plurality of idler sprockets 62 are mounted on shafts 63 which extend between the plate members 47 at opposite sides of the bed 16 and engage the lower run of the respective chains in the manner illustrated in FIG. 6 of the drawings. Preferably, two or more of the idler sprockets 62 are spring-biased in a downward direction so as to constantly bear against, and tension, the lower runs of the chains in a manner well understood in the art.

It will be perceived by reference to FIG. 1 that the chains 42 and 44 extend to a position near the rear end of the bed extension 22, at which point the upper and lower runs of the chains are joined through a bight portion which extends around the sprockets disposed at the rear end portion of the bed extension. Secured to the rear end of the bed extension 22, and projecting rearwardly therefrom, is a slide shoe 66 which is geometrically configured to provide a sliding surface which can slide along the ground at a time when the bed extension 22 is pivoted downwardly to its ramp-forming position. It will also be noticed in referring to FIGS. 1 and 2 that an axle 68 projects transversely through the slide shoe 66 and out of the opposite sides thereof to permit a pair of rollers or casters 70 to be rotatably mounted on the axle, and positioned for contact with the ground at a time when the bed extension 22 is pivoted downwardly to form a ramp.

For the purpose of retaining large cylindrical bales of hay on the bed 16 and bed extension 22 once the bales have been elevated to a transport position, a pair of contoured bale-retaining fence assemblies are provided on opposite sides of the truck bed 16 and the bed extension 22. Thus, a contoured fence assembly 72 is provided at one side of the bed 16, and extends from the rear of the bed to a location spaced from the forward end thereof in a manner and for a purpose hereinafter described. A second contoured, bale-retaining fence assembly 74 is positioned on the opposite sides of the bed 16, and extends from the rear of the bed to the forward end thereof. The contoured bale-retaining fence assemblies 72 and 74 are generally similarly constructed, and each includes a plurality of longitudinally spaced, upwardly extending angled members 76 (see FIG. 2). The upwardly extending angled members 76 are joined at their lower ends to the outer sides of the plates 47, and have their upper ends secured to longitudinally extending rails 78. Intermediate the length of the angled, upwardly extending members 76, an intermediate rail 80 projects forwardly from the rear of each of the respective bale-retaining fence assemblies 72 and 74. It will be perceived in referring to FIG. 3 that the shape of the contoured bale-retaining fence assemblies is such that these fence assemblies are substantially concave as viewed from the central part of the truck bed, and thus tend to fit around and better retain the cylindrical hay bales carried on the truck bed. A cylindrical bale 81 is shown in dashed lines in FIGS. 3 and 4 of the drawings as such bale rests upon the truck bed 16 in a position to be advanced on the bed by the conveyor 40.

At the forward end of the bale-retaining fence assembly 74 on the right side of the truck bed 16, a track subassembly 82 is provided for a purpose hereinafter described (see FIGS. 1, 2 and 4). The track subassembly 82 includes outwardly and upwardly extending supporting members 83 secured to the outer side of the plate 48, and a pair of opposed, facing channel members 84 spaced vertically from each other and interconnected by a plurality of connecting bars 85. The channel members 84 of the track subassembly 82 function to guide and slidably support a reciprocating structural element forming a portion of a reciprocating, foldable pusher plate assembly hereinafter described.

On the rearwardly extending bed extension 22, a pair of opposed bale-retaining fence assemblies are mounted on opposite sides of the bed extension and project upwardly therefrom. Thus, the fence assembly 86 and a fence assembly 88 are provided and, in each case, include elongated rail members 90 extending from one end of the respective bed extension to the other, and supported on outwardly and upwardly extending angled members 92. It should be pointed out that the angled members 92 are pivotally connected at their lower ends to the outer sides of the frame members 25 of the bed extension 22, and at their upper ends to the respective elongated rail member 90. This construction, together with the pivotal connection of the forward ends of the elongated rail members 90 to the upper ends of the rearmost angled members 76 constituting elements of the bale-retaining fence assemblies 72 and 74 carried on the bed 16, permits the parallelism of the several structural elements of the bed extension 22 to be maintained as the extension moves between its horizontally extending and its ramp-forming positions as shown in FIG. 1.

Figure 2:
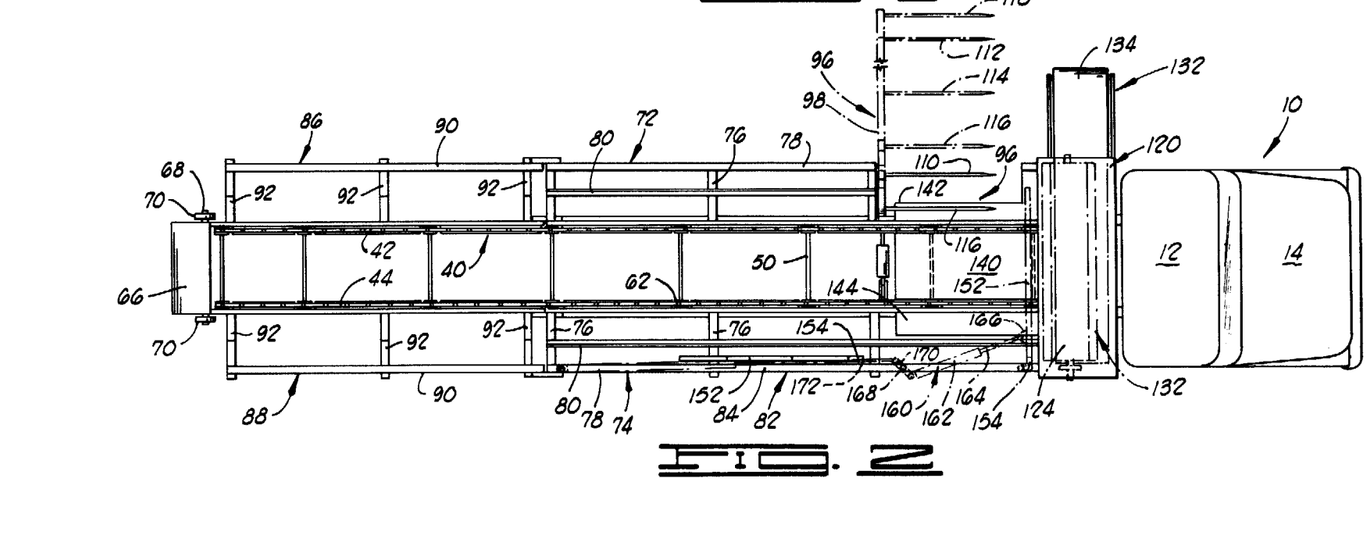
FIG. 2 is a plan view of the hay loading, transporting and feeding system of the invention, and illustrating in dashed lines certain alternate operative positions of structural sub-combinations included within the system.
Figure 4:
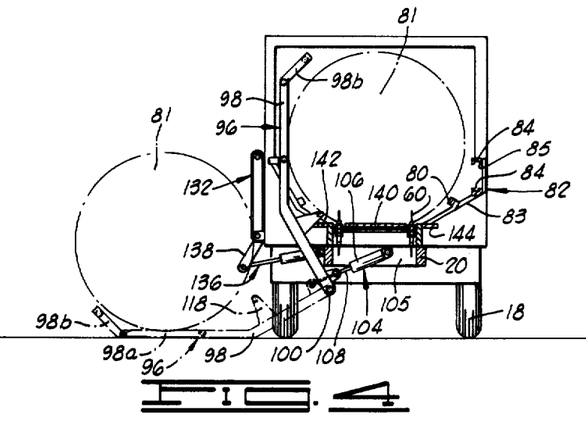
FIG. 4 is a sectional view taken along line 4—4 of FIG. 1.

A lateral bale pick-up cradle assembly designated generally by reference numeral 96 is pivotally mounted on the truck bed 16 adjacent the forward end thereof, and immediately ahead of the forward end of the bale-retaining fence assembly 72 (see FIGS. 1, 2 and 4). The bale pick-up cradle assembly 96 includes an angulated arm 98 which has one of its ends pivotally connected to a bracket under the frame of the truck as illustrated at 100 in FIG. 4 to permit the angulated arm to fold from the full line position shown in FIG. 4 to the dashed line position illustrated in the same figure. Stated differently, the angulated arm 98 and the bale pick-up cradle assembly 96 of which it is a part can pivot from a vertically extending, bale-retaining transport position, in which it extends upwardly at one side of the bed 16, to a downwardly and outwardly extending bale pick-up position in which it is used to pick up cylindrical bales lying on the ground alongside the truck 10 as the truck is driven forward. A cylindrical bale 81 in the pick-up position alongside the truck 10 is illustrated in dashed lines. For the purpose of pivoting the bale pick-up cradle assembly 96 between its vertically extending and its bale pick-up positions, a hydraulic piston and cylinder assembly, designated generally by reference numeral 104, is secured to a cross-member 105 extending between the frame members under the truck, and includes a cylinder 106 and a piston 108 which is extensible from the cylinder to pivot the cradle assembly 96 outwardly and downwardly in the manner illustrated.

It will be noted in referring to FIG. 4 that the pivoted angulated arm 98 of the bale pick-up cradle assembly 96 is bent through two obtuse angles between the point of pivotation 100 on the frame of the truck 10 and its outer end. Thus, when the cradle assembly 96 is pivoted downwardly to its bale pick-up position, the arm 98 includes a central arm segment 98a which extends substantially horizontally at ground level, and an outer arm segment 98b which projects upwardly and outwardly at the outer end of the angulated arm. The cradle assembly 96 further includes a plurality of substantially parallel, forwardly extending bale pick-up tines 110, 112, 114 and 116 which have one of their ends secured to the angulated arm 98 and project normal thereto toward the forward portion of the truck 10. The tine 110 is located at the upper end of the outer arm segment 98b, and tines 112 and 114 are spaced on the central arm segment 98a of the angulated arm 98. The tine 116 is carried on a projecting plate 118 which is secured to the upper side of the angulated arm 98 on the inboard or downwardly and outwardly extending segment of the arm as it is viewed in dashed lines in FIG. 4.

The tines 110-116, in collective array, thus form a bale-engaging cradle at a time when the cradle assembly 96 is extended downwardly to its bale-engaging position, and the tines function to pass around and facilitate the picking up of the cylindrical bale 81 as the angulated arm 98 is retracted or elevated by the use of the piston and cylinder subassembly 104. As the bale pickup cradle assembly 96 is pivoted upwardly, the cylindrical bale 81 ultimately rolls over onto the bed 16 of the truck 10 and comes to rest in a centralized position upon the conveyor 40. It will be noted that in its raised, substantially vertically extending position, the bale pick-up cradle assembly 96 functions to close the space which exists at the forward end of the contoured fence assembly 72 so that no opening exists at this location to permit bales to be lost off the truck bed 16. (See FIGS. 1, 2 and 4.)

Mounted to the rear of the cab 12 on the truck 10, and at the forward end of the bed 16, is a bale cutting and disintegrating assembly, designated generally by reference numeral 120. The bale cutting and disintegrating assembly 120 includes a large, vertically extending housing 122 of generally rectangular parallelepiped configuration, which housing includes a top wall, opposed side walls and a forward wall which is immediately to the rear of the truck cab 12. The rear side of the housing 122 which faces toward the rearwardly extending bed 16 is open. The housing 122 encloses a plurality of cooperating grinding or chopping rollers or drums 124, 126 and 128. Each of the grinding drums 124-128 carries at its outer periphery a plurality of teeth or bars 130, and the rollers and their associated teeth cooperate to grind and disintegrate the hay in a bale fed into the cutting and disintegrating assembly 120 in a manner hereinafter described. A suitable drive which includes a belt or chain 129 driven from a powered pulley or sprocket 131 is used to drive the rollers 124-128 in rotation.

A cross-conveyor designated generally by reference numeral 132, and including a moving endless belt 134, or other suitable type of endless conveyor, has a major portion of its length positioned in the lower portion of the housing 122 beneath the drums 124-128 for receiving cut or disintegrated hay which has been shredded and cut up by the rollers as a bale is forced into and between the rollers. The outer segment of the cross-conveyor 132 is made foldable so that it can be folded from the position shown in full lines in FIGS. 2 and 3 to an upwardly extended, retracted position, as illustrated in FIG. 4, by means of a piston and cylinder assembly 136 and associated linkage 138.

For the purpose of preventing excessive loss of hay during the shredding and disintegration of a bale using the cutting and disintegrating assembly 120, a horizontally extending floor plate 140, along with horizontally aligned plate wings 142 and 144, are positioned in substantial alignment with the upper runs of the chains 42 and 44 of the conveyor 40 in the positions best illustrated in FIGS. 2 and 4 of the drawings.

A final important substructure of the hay loading, transporting and feeding system of the invention is a reciprocating, foldable pusher plate assembly which is carried on the bed 16 and is designated generally by reference numeral 150. The foldable pusher plate assembly 150, in the illustrated embodiment, is actually mounted directly upon the contoured bale-retaining fence 74 and the track subassembly 82. The pusher plate assembly includes a large flat pusher plate 152 which extends upwardly from a lower edge 152a spaced upwardly from the conveyor 40. At its lower right side, as viewed from the rear of the truck 10, the pusher plate 152 carries a horizontally projecting flange 154 which extends to the right side of the pusher plate in substantially coplanar alignment therewith, and has a lower edge which is in alignment with the lower edge 152a of the pusher plate.

The flange 154 has its outer, vertical edge pivotally connected through a hinge 156 (see FIGS. 1 and 2), to a generally U-shaped slide frame 158. The U-shaped slide frame 158 includes a pair of horizontally extending legs 158a and 158b which are slidably mounted in the channels 84 of the track subassembly 82 to facilitate sliding movement of the slide frame longitudinally of the truck bed. The forward ends of the legs 158a and 158b are interconnected by a suitable web member 158c. It will be perceived that the described arrangement facilitates the pivotal movement of the pusher plate 152 from a first position in which it is folded flat alongside the U-shaped slide frame 158 and the track subassembly 82, as illustrated in FIG. 1, to a second position in which it extends normal to the track subassembly 82, and transversely across the truck bed 16.

For the purpose of obtaining such pivotal action of the pusher plate 152, a hydraulic piston and cylinder subassembly 160 is provided and includes a cylinder 162 and a piston rod 164. The rod 164 is reciprocable for the purpose of pivoting the pusher plate to its transversely extending position, as illustrated in dashed lines in FIG. 2, or retracting it to its folded position alongside the track subassembly 82, as illustrated in full lines in FIGS. 1 and 2. In order to enable such pivotal movement of the pusher plate 152 to occur, the outer end of the piston rod 164 is pivotally connected to the pusher plate through a suitable bracket 166 at a location on the pusher plate about where it is joined to the flange 154 (see FIGS. 1 and 2). The base end of the cylinder 162 is pivotally connected to one end of a toggle link 168 which is pivotally supported at its midpoint by a pivot pin 170 extended at its opposite ends into the legs 158a and 158b of the U-shaped slide frame 158. The opposite end of the toggle link 168 from that end thereof which is pivotally connected to the cylinder 162 is pivotally connected to the outer end of a piston rod 172 which is extensible from, and retractable into, a hydraulic cylinder 174 mounted on the upper inner side of the bale-retaining fence assembly 74. The base end of the cylinder 174 is pivotally connected to a suitable bracket 176 rigidly mounted on the rearmost angled member 76 at the rear end of the fence assembly 74 as illustrated in FIG. 1.

Operation

In the use and operation of the hay loading, transporting and feeding system of the invention, the truck 10 can be driven to a location where hay is to be loaded or unloaded, or is to be ground and disintegrated for the purpose of feeding cattle by windrowing the disintegrated or ground up hay on the ground. It should be pointed out that though, in the illustrated embodiment of the invention the system is illustrated as being incorporated in an automotive vehicle in the form of a truck, the system can also be mounted upon a wheeled trailer which can be towed behind a tractor or coupled to a suitable towing vehicle.

Following harvest, and at a time when the large cylindrical bales as hereinbefore described are disposed in the field, it will frequently be desirably to transport these bales to another location, either for storage or feeding. In order to accomplish such transport, the truck 10 is driven to the field where the hay bales are located and the bales may then be loaded upon the elongated bed 16 in either of two ways.

In one of these ways, the truck 10 is backed up toward the hay bale and, immediately prior to reaching the bale, the rearwardly extending bed extension 22 is pivoted downwardly from the horizontally extending position, as shown in full lines in FIG. 1, to the dashed line position shown in that figure. It will be noted that when the bed extension 22 is pivoted downwardly, it forms a ramp between the rear end of the bed 16 and the ground. Downward pivotation of the bed extension 22 is accomplished by means of the interconnected hydraulic piston and cylinder assemblies 26 and 28.

When the bed extension 22 is lowered to its ramp-forming position, either the slide shoe 66 or the rollers 70, or both, will contact the surface of the earth. The advantage of the construction described and illustrated is that, where small depressions or ruts are encountered in which the wheels do not run smoothly over the ground, the slide shoe 66 will nevertheless slide over such anomalies without hanging the rear end of the bed extension 22. The slide shoe 66 also functions to provide a wedge element for the purpose of loading the bale into the rear end of the bed 16. Thus, after the bed extension 22 has been lowered, the truck 10 is then backed further toward the bale so that the slide shoe 66 commences to move under the edge of the bale, wedging it upwardly. It will be apparent, of course, that the wedging action occurs by movement of the slide shoe 66 under the planar end face of the bale and substantially parallel to the longitudinal axis of the bale. Backing of the truck 10 continues until the slide shoe is pushed under the bale far enough that the tines or spikes 60 carried on the endless conveyor 40 will bite into the bale and commence to apply force tending to move the bale up that portion of the conveyor which traverses the bed extension 22. Preferably, the rearward backing movement of the truck 10 is continued until a major portion of the bale is up on the bed extension. This assures that the tines 60 will not rip out the leading end of the bale due to frictional drag of a major portion of the bale on the ground prior to a time that most of the bale is up onto the bed extension.

Once most of the cylindrical bale is resting upon the bed extension 22, the tines 60 will function to move the bale on up the bed extension and onto the rear end of the bed 16 of the truck 10. The conveyor is, of course, formed by the endless chains 42 and 44, and its conveying action upon the bale continues as the bale reaches the upper end of the bed extension 22 and passes over onto the rear end of the bed 16.

Figure 3:
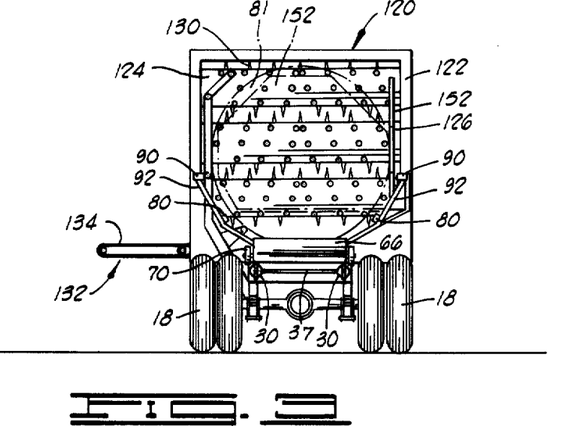
FIG. 3 is a rear elevation view of the hay loading, transporting and feeding system of the invention.

During the movement of the bale up the bed extension 22, the bale is retained by the fence assemblies 86 and 88 against lateral movement by which it would tend to roll sideways off the bed extension. As shown in FIG. 3 and as hereinbefore described, the fence assemblies 86 and 88 are contoured to the general outline of the cylindrical peripheral configuration of the cylindrical bales so that there is little room for sideways rolling movement by the bale before it contacts one of the contoured fence assemblies. The same confining action is afforded by the contoured fence assemblies 72 and 74 disposed on the rear portion of the bed 16. As the conveyor 40 continues to move the picked-up bale forwardly on the bed 16, the fence assemblies confine the bale to its position over the conveyor and prevent it from rolling off either side of the bed.

As the bale nears the forward end of the bed 16, it is confined at this location by the upwardly extending bale pick-up cradle assembly 96 which is disposed ahead of the fence assembly 72, and also by the track subassembly 82 which, in part, is disposed ahead of and in horizontal alignment wih the fence assembly 74. Forward movement of the bale by the conveyor 40 ultimately brings the leading end of the bale against the grinding drums mounted within the housing 122 of the bale cutting and disintegrating assembly 120. If these drums are inoperative at this time, the bale is simply abutted against the rearwardly facing side of the drums, and is thus located at the forward end of the bed 16 for transport to another location.

After a bale has been loaded onto the bed 16 in the manner described, and has been passed to a location on the bed 16 which is adjacent the bale cutting and disintegrating assembly 120, another bale can be picked up and moved foward on the bed in the same fashion. Since the elongated endless conveyor 40 carrying the tines 60 is utilized for this purpose in the manner previously described, and since the forward ends of the upper runs 42a and 44a of the chains 42 and 44 pass under the first bale which, in some instances, will have already been conveyed to the forward end of the bed 16, it is preferable to mount the horizontally extending floor plate 140 and the plate wings 142 and 144 on the bed 16 so that they incline upwardly toward the forward end of the bed to a level such that the plate and plate wings tend to protect the bottom side of the leading bale from the tearing action of the tines 60 passing thereunder during the continued operation of the conveyor for loading additional bales. These plates and plate wing structures function to catch and retain such loose hay as may be snagged or torn loose from the bottom side of the leading bale after it has been positioned near the forward end of the bed 16.

After a second bale has been picked up in the manner described and positioned to the rear of the leading bale, yet a third bale can be loaded in the manner described and positioned in serial, longitudinal alignment with the other two previously loaded bales, and rearwardly therefrom on the bed 16.

Finally, another bale may be pulled up the inclination of the bed extension 22 to a point where it is located near the upper end of the bed extension, and this structure then elevated to its horizonally extending position as shown in full lines in FIG. 1. It is thus possible to carry at least four of the large cylindrical bales on the assembly as thus described. These can be easily transported from the field to a location of discharge, at which time the bales can be discharged in the reverse order from the order in which they were loaded. It will be apparent, of course, that one or more of the bales can be discharged at any selected location, just as one or more bales can be loaded from various locations in the field in the manner which has been described.

The power provided for the operation of the endless conveyor 40, and the nature of the conveyor construction, are such that another, and preferred, method may be used in loading bales on the assembly by conveying them upwardly on the inclined bed extension 22. In this method, in order to minimize damage to the bales as a result of the tines 60 of the conveyor 40 dragging through the lower sides of the bales after they are loaded far forward, one bale may be picked up in the manner described and moved to a point very near the top of the bed extension 22, or slightly past the top of the bed extension and onto the rear end of the bed 16. With the bale retained in this position by the impaling tines 60, the bed extension may then be elevated slightly so as to clear the slide shoe 66 and rollers 70 of the ground, and the truck may then be backed to the next location where a bale is to be picked up. This second bale can then be loaded by lowering the bed extension 22, reactivating the conveyor and moving this bale up immediately behind the bale which is already partially loaded. This procedure is repeated until several bales have been loaded in the manner described, and are then all concurrently conveyed by the converter 40 to a position on the bed 16 where the leading bale contacts the inactive grinding drums 124-128 positioned within the housing 122 of the bale cutting and disintegrating assembly 120.

In yet another way of using the versatile hay loading, transporting and feeding system of the invention, hay bales may be picked up from a lateral position alongside the truck 10. When this type of loading operation is to be performed, the truck is driven alongside a cylindrical hay bale so that the direction of travel of the truck parallels the longitudinal axis of the cylindrical hay bale. At a point when the hay bale is approximately alongside the cab 12 and hood 14 of the truck, the bale pick-up cradle assembly 96 is moved into this position by actuation of the piston and cylinder assembly 104. Such actuation pivots the angulated arm 98 downwardly and brings the forwardly extending pick-up tines 110-116 into a position where they will pass around and cradle the cylindrical bale as it lies on the ground. The truck is then slowly driven forward so that the bale pick-up tines 110-116 pass around the outer sides of the cylindrical bale, and the angulated arm 98 is brought into close proximity to the planar end face of the bale. This relationship is shown in FIG. 4, where the cylindrical bale is indicated by reference numeral 81.

When the bale pick-up cradle assembly 98 has been positioned at this location with the bale pick-up tines 110-116 passing along the cylindrical side of the bale 81 at circumferentially spaced intervals, the hydraulic piston and cylinder subassembly 104 is actuated to retract the piston rod 108 into the cylinder 106. This causes the angulated arm 98 to undergo upward pivotation and, in doing so, to cause the bale pick-up tines 110-116 to come in contact with the sides of the bale and lift the bale upwardly. At some point during the upward pivotal movement of the bale pick-up cradle assembly 96, the cylindrical bale rolls over onto the bed 16 and comes to rest upon a portion of the conveyor 40, and upon the horizontally extending floor plate 140 and the aligned plate wings 142 and 144. In this position the bale is immediately adjacent the open rear side of the housing 122 of the bale cutting and disintegrating assembly 120.

If it should then be desired to load additional bales by means of the bale pick-up cradle assembly 96, the endless conveyor 40 can be activated and reversed in its direction of movement from that previously described, so that the upper runs 42a and 44a of the chains 42 and 44 move rearwardly and cause the initial bale loaded by the bale pick-up cradle assembly to be moved toward the rear of the bed 16.

After the first bale is moved radially in the manner described, the bale pick-up cradle assembly 96 is again lowered to its bale pick-up position as shown in dashed lines in FIG. 4 and is used for picking up one or more additional bales. As the bales are picked up with the bale pick-up cradle assembly, they can be moved rearwardly on the bed 16 until the entire bed 16, as well as the bed extension 22, are filled up with bales, with the last bale having been placed on the forward end of the bed by the use of the bale pick-up cradle assembly. This system of loading, if carried out by the use of selective increments of rearward conveyor and bale movement, has the advantage of avoiding any tearing action on the bottom of the bales by the moving conveyor.

From the description of the operation of the hay loading, transporting and feeding system of the invention as thus far set forth, it will be perceived that the flexibility in usage of the apparatus is such that bales in the field which may be difficult to gain access to for pick-up at the rear of the bed extension 22 may nevertheless be readily accessible for lateral pick-up using the bale pick-up cradle assembly 96. It will also be apparent that combinations of the two types of loading of the bales can be employed. Thus, several bales may be loaded by utilizing the endless conveyor 40 and the bed extension 22 to bring such bales into a position where they are positioned immediately rearwardly of that position which would be occupied by bales loaded on the bed 16 by the bale pick-up cradle assembly 96. This latter assembly of the system can then be used to load the final bale in place at the forward end of the bed 16, and just ahead of the leading bale of that group which has been loaded using the conveyor 40 and the bed extension 22. Alternately, the leading bale placed on the forward end of the bed 16 may be initially loaded there by means of the bale pick-up cradle assembly 96, and then the conveyor 40 and bed extension 22 used to load additional bales.

It may be here pointed out that for the purpose of accomplishing this dual loading using both the rear loading via the bed extension 22, and the lateral bale pick-up cradle assembly 96, the reciprocating foldable pusher plate assembly 150 can be utilized to form a partition extending transversely across the bed 30 and over the conveyor 40 at precisely that location where the leading bale picked up by the bale pick-up cradle assembly 96 will terminate at its rearwardly facing side, and to which the leading side of the next adjacent bale will be brought by the conveyor 40. This use of the pusher plate 152 of the reciprocating foldable pusher plate assembly 150 as a partition assures that no difficulty will be exprienced as a result of improper positioning of one of the bales in relation to that location on the bed 16 where the bale rolled over onto the bed by the bale pick-up cradle assembly 96 will be located. The operation of the pusher plate assembly 150 will be better understood from the description of the use of that structure hereinafter appearing.

In addition to its function of facilitating the loading and transporting of large cylindrical hay bales as described, the system of the invention is also very useful for transporting bales to a location where cattle are to be fed, and then chopping up or disintegrating the large cylindrical bales into chopped or shredded hay which can be easily consumed by livestock. To this end, after the loaded bales are transported to a feeding location, the grinding drums 124–128 located within the housing 122 of the bale cutting and disintegrating assembly are energized or activated so that the teeth 130 on these drums or rollers cooperate in dragging hay from one of the bales between the rollers, and cutting it up or disintegrating it. As previously pointed out, elongated helically turned bars can also be used on the rollers or drums 124–128 instead of the teeth 130 in an alternate form of construction.

As the grinding drums 124–128 undergo rotation, the leading hay bale on the bed 16 is driven or pushed into the grinding drums by one or both of two means. Thus, at this time, the conveyor 40 is usually energized so that the teeth or tines 60 carried thereon tend to push the leading bale toward the bale cutting and disintegrating assembly 120 located at the forward end of the bed. The use of the conveyor 40 for this purpose is most effective when there are several bales on the bed 16, and the chains 42 and 44 are delivering their forward pushing action to several of the bales. The effect of the use of the conveyor 40 at this time is to impart a forward force to the second, third and fourth bales on the bed 16 and bed extension 22, if such bales are loaded. These bales in turn push flatly against the planar end face of the leading bale which is immediately adjacent the bale cutting and disintegrating assembly 120.

Where multiple bales are positioned on the bed 16 and this type of action is used to drive the forward bale into the bale cutting and disintegrating assembly 120, it is often unnecessary to use any other feeding force, and the reciprocating, foldable pusher plate assembly 150 is folded into its inactive foldable position alongside the contoured fence assembly 74 at one side of the bed 16. Where only a single bale is located at the forward end of the bed 16, however, and it is desired to feed this bale to livestock, the reciprocating foldable pusher plate assembly 150 is actuated so as to extend the pusher plate 152 into a transverse position over the bed 16. In accomplishing this, the pusher plate 152 is moved outwardly in pivotation about its hinged support upon the generally U-shaped slide frame 158 by actuating the cylinder 162 to extend the piston rod 164. This action also has the effect of pivoting the toggle link 170 about its pivotal axis at the pin 168 to swing the piston rod 172 slightly inwardly relative to the track subassembly 82. As the piston rod 164 continues to be extended from the cylinder 162, the pusher plate 152 is ultimately extended to a position where it projects at a right angle across the conveyor 40, and thus is extending parallel to the rear planar end face of the leading bale at the forward end of the bed 16.

After the pusher plate 152 has been so extended to its transversely projecting position, the cylinder 174 is energized to effect the extension of the piston rod 172 therefrom. Extension of the piston rod 172 from the cylinder 174 causes the generally U-shaped slide frame 158 to undergo sliding movement in the channel members 84 of the track subassembly 82. The generally U-shaped slide frame 158 is thus caused to move forward along the bed 16 in these channel members, carrying with it the transversely extending pusher plate 152, which at this time projects at right angles to the generally U-shaped slide frame and is hinged thereto through the flange 154. This movement toward the front end of the bed 16 now causes the pusher plate 152 to also move in this direction. It is thus brought into contact with the rearwardly facing planar end of the cylindrical bale, and applies a forward force to the bale as the forward movement of the pusher plate is continued by further extension of the piston rod 172 therefrom. The bale is thus forced into the rotating grinding drums 124–128 and is disintegrated into a form most suitable for feeding the cattle.

It should be pointed out that if it is contemplated that one bale may be fed to the cattle and the rest stored at some location, the previous arrangement in which the pusher plate 152 is extended transversely across the conveyor 40 to function, during loading and transport, as a partition separating the leading bale on the bed 16 from those positioned rearwardly therefrom is especially advantageous. This is because, with the pusher plate 152 so extended during loading and transport, it is in position to immediately force the leading bale of hay into the grinding drums 124–128 when the truck arrives at the feeding location. If the truck should arrive at the location where the remaining bales are to be stored prior to the time that it arrives at the feeding location, this can be accomplished by causing the endless conveyor 40 to move in a direction such that the upper runs 42a and 44a of the chains 42 and 44 move rearwardly, and thus unload the rearmost bales of hay down the bed extension 22 which is then positioned in its ramp-forming position.

It should further be pointed out that an important advantage of the provision of the reciprocating, foldable pusher plate assembly 150 is that where the last bale of hay, or only bale of hay, positioned upon the bed 16 is to be fed to livestock by passage through the bale cutting and disintegrating assembly 120, the action of the conveyor 40 alone is seldom effective to efficiently and cleanly feed this last bale into the grinding drums 124–128 of the bale cutting and disintegrating assembly. The conveyor tines 60 are acting to move the bale forward only at the location of the lower portion of the bale. The grinding drums 124–128 are, however, above this location, and the net result of feeding this last bale using only the conveyor 40 is that the bale tends to topple or fall over rearwardly, or to be thrown up in this direction, or the bale will also tend to be torn up and disintegrated with a considerable amount of the hay not passing through the bale cutting and disintegrating assembly 120, but instead falling rearwardly from this assembly without being cut or disintegrated. The horizontally extending floor plate 140 and horizontally aligned plate wings 142 and 144 help to prevent this thrown back hay from being lost to the ground but nevertheless, feeding of the last or only bale by the conveyor alone would, if such were necessary, be relatively inefficient. The reciprocating foldable pusher plate assembly 150 which is placed in use at this time, however, prevents such waste, and assures efficient feeding of the last or only bale to the disintegrating assembly. This is because the large pusher plate 152 projects across and makes contact with a substantial portion of the total cross-sectional area of the bale, and bears flatly against the planar end face of the bale. The bale is thus forced evenly into the grinding drums over its entire diametric extent, and uniform grinding of the entire bale is effected.

It should be pointed out that at the time of using the bale cutting and disintegrating assembly 120 for grinding up or disintegrating the hay bale into more useful form for feeding stock, the cross-conveyor 132 is placed in operation. Initially, the outer end portion of the cross-conveyor 132 is lowered to its horizontally extending position by means of the piston and cylinder assembly 136. When it is in this lowered operative position, it is in the location illustrated in FIG. 3. The cross-conveyor 132 is then energized by suitable drive belts connected to one of the rollers which support the endless belt 134 thereof, and disintegrated and chopped hay which falls downwardly from the drums 124–128 during operation of the disintegrating assembly is caught upon the upper surface of the endless belt 134 and is moved outwardly to the outer end of the cross-conveyor 132 at the left side of the truck 10 as the cross-conveyor is shown in FIG. 2. The chopped and disintegrated hay is, in this way, windrowed out along the ground as the truck is driven slowly forward.

Yet another variation is possible in the use of the bale pick-up cradle assembly 96. The angulated arm 98, instead of being extended all the way to the pick-up position illustrated in dashed lines in FIG. 4, can be extended to a location in which the forwardly extending bale pick-up tines 110, 112 and 114 carried thereon will extend directly toward the planar end face of the bale 81 and, as the truck 10 is driven forward, will impale this bale in several places. If a harvest hand or other personnel blocks the bale 81 at its other end, the tines 110–114 can be driven far into the bale, i.e., to a location where the end face of the bale is virtually abutted against the angulated arm 98.

With the bale so impaled, the piston rod 108 can then be retracted into the cylinder 106 to swing the angulated arm 98 of the cradle assembly upwardly to a location where the bale can be transported on the cradle assembly—that is, remaining impaled upon the tines 110–114. This will then facilitate unloading the bale in the same fashion as it was loaded. In other words, the bale can be unloaded laterally or to one side of the system if this should be desired. Unloading is accomplished by extending the piston rod 108 from the cylinder 106 to a sufficient distance that the lower side of the cylindrical bale 81 is caused to bear downwardly on the ground with substantial force. The truck 10 can then be backed up to extricate the tines 110–114 from the bale since they will slide out of the bale at this time more easily than the bale will slide along the ground.

An alternate embodiment of the invention is depicted in FIGS. 7–10 of the drawings. Since much of the structure in the alternate embodiment of the invention is identical to that which has been previously described, and is characteristic of the embodiment shown in FIGS. 1–6, identical reference numerals have been utilized where identical structure is included in the system.

In the embodiment of the invention illustrated in FIGS. 7–10, a different construction of the endless conveyor is utilized. Here, the forward portion of the conveyor is mounted upon and carried by box beams which are secured directly over the frame members 20 of the bed 16. The rearward portion of the conveyor is carried upon two similar box beams which, in this embodiment, constitute the frame members 39 of the bed extension 22. This construction is more clearly illustrated in FIGS. 8–10.

Figures 7, 8, 9, 10:
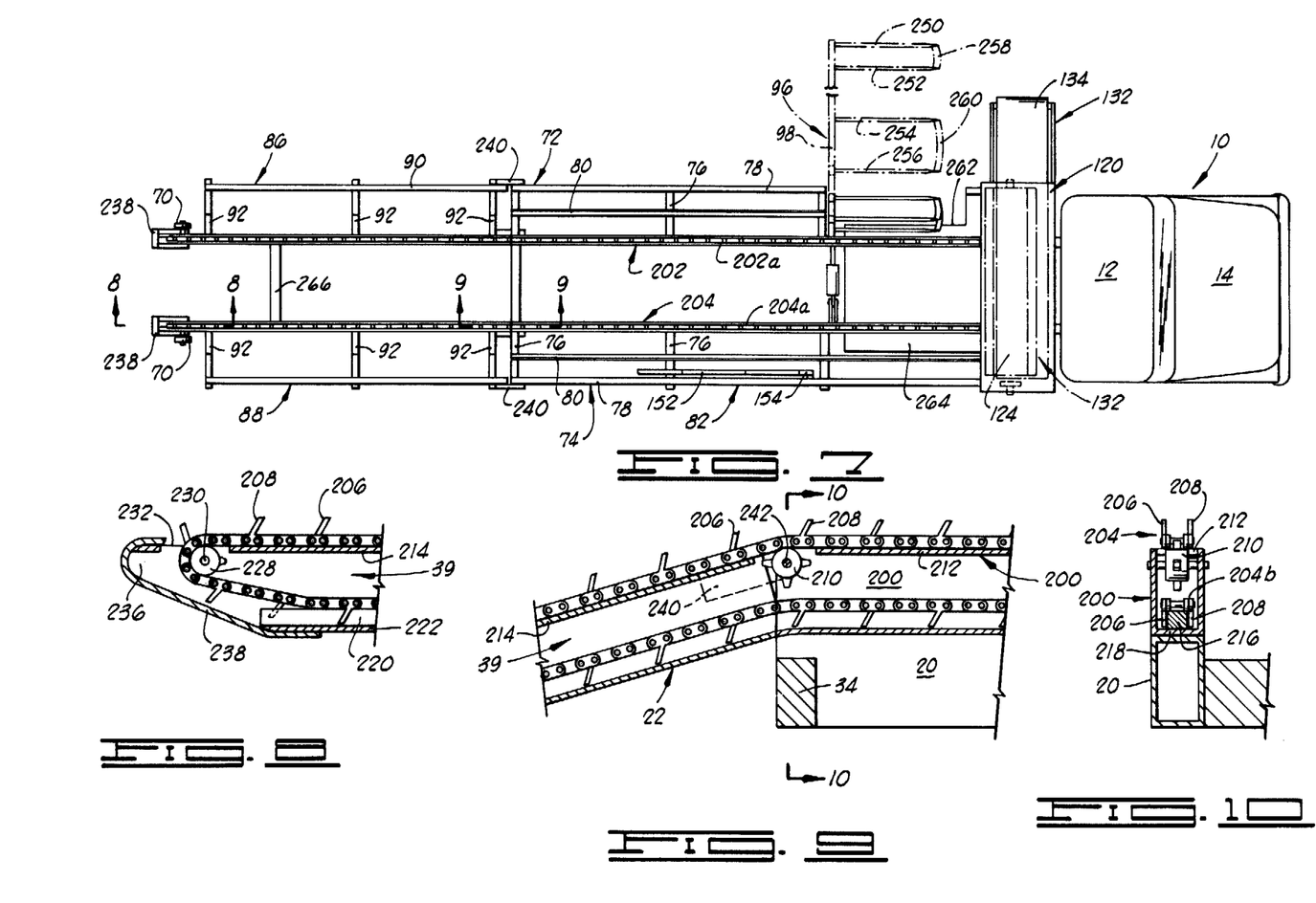
FIG. 7 is a plan view of a modified embodiment of the hay loading, transporting and feeding system of the invention, and illustrating in dashed lines, certain alternate operative positions of structural combinations included within the system.
FIG. 8 is a sectional view taken along line 8—8 of FIG. 7.
FIG. 9 is a sectional view taken along line 9—9 of FIG. 7.
FIG. 10 is a sectional view taken along line 10—10 of FIG. 9.

Thus, in referring to FIG. 10, it will be noted that the frame member 20 has mounted thereon a box beam 200 which extends from the rear end of the frame member forwardly to a position closely adjacent the forward end of the bed 16. This type of construction and structural relationship also characterizes the other, substantially parallel frame member and a box beam which is superimposed thereon.

The conveyor utilized in this embodiment includes a pair of endless chains 202 and 204 (see FIG. 7). Each of the chains 202 and 204 includes a plurality of tines or spikes which are secured to spaced links along the chain, and in alternating sequence on opposite sides of the chain. Thus, for example, the tines 206 are secured to the left side of the chain as it is viewed in FIG. 10, and the tines 208 are secured to the right side of the chain. With this type of conveyor chain construction, the central portion of the chain between the links thereof is open, and thus can be engaged by a sprocket, such as the sprocket 210 illustrated in FIGS. 9 and 10 and hereinafter described. The upper run of the chains 202 and 204 which are hereinafter referred to by reference numerals 202a and 204a, respectively, slide or ride on the upper side 212 of the respective box beam 200, and also on the upper side 214 of the box beam frame members 39 of the rear bed extension 22.

The lower runs of the chains 202 and 204 are identically disposed in their respective box beams 200, and this structural relationship is illustrated in FIGS. 8–10. Referring specifically to FIG. 10 the lower run, 204b, of the chain 204 is illustrated. The lower run of the chain 202 is similarly constructed. It will be noted in referring to these Figures that a rod 216 of substantially rectangular cross-section is welded or otherwise suitably secured to the central portion of the upper side of the bottom wall or plate 218 of the box beam 200. A similar rod 220 is in like manner welded to the central portion of the upper side of the bottom plate or wall 222 which forms the bottom of the box frame member 39 of the bed extension 22. The transverse dimensions of the rods 216 and 220 are such that the tines 206 and 208 disposed on opposite sides of the chains 202 and 204 will straddle their respective rods in the manner illustrated in FIGS. 8-10. The lower run 204b of the chain 204 thus tracks the rod 216 as a result of this straddling relationship, and the same is true for the lower run of the chain 202.

In order to assist in maintaining tension in the chains 202 and 204, as well as to assure their proper positioning with respect to their respective box beams, idler sprockets 228 are mounted upon shafts 230 which project through the opposite side of the box beam frame members 39 of the bed extension 22 and are positioned so that the chains, when passed around the sprockets 228, are positioned to guide the upper runs 202a and 204a onto the upper sides of the box beam frame members 39. To accommodate the sprockets 228, suitable slots 232 are provided in the upper side of the rear ends of the box beam frame members 39. Each of the box beam frame members 39 is cut away on a bias cut or taper at its lower rear end so that it terminates in a slightly rounded point portion, as designated by the reference numeral 236 in FIG. 8. A curved runner plate 238 is welded to the lower side or wall 222 of each of the box beam frame members 39, and to the opposite side walls thereof and is turned back up over the top wall 214 of each of the box beam frame members in the manner illustrated in FIG. 8. The runner plates 238 function, in the manner hereinbefore described, to slide along the ground and allow the rear end of the bed extension 22 to be slid under a bale of hay so that the tines 206 and 208 on the chains 202 and 204 can bite into and pick up the bale.

At the forward end of each of the chains 202 and 204, each chain is passed around a powered sprocket (not shown), and these sprockets are mounted in the box beams 200 similarly to the way in which the sprocket 228 is mounted in the box beam frame member 39 as shown in FIG. 8. The endless chains 202 and 204 are thus caused to move along the general path previously described in loading and unloading hay.

In order to facilitate the downward pivotal movement of the bed extension 22 so that it moves into the position shown in FIG. 9 for purposes of picking up (or unloading) hay bales, the box beam frame members 39 each carry, at the outer side thereof, an extension pivot plate 240 (see FIGS. 7 and 9). The extension pivot plates 240 project from the respective box beam frame members 39 forwardly to a point where they are journaled upon the outer ends of a shaft 242 upon which the sprockets 210 are rotatably mounted. The sprockets 210 are merely idler sprockets which function to guide the upper runs 202a and 204a of the chains 202 and 204 through the angulation or bend required to enable the chains to accommodate themselves to the downward pivoting movement of the bed extension 22. It will also be noted in referring to FIG. 9 that the lower forward side of each of the box beam frame members 39 is cut away so that there is no interference between the lower forward edges or corners of these frame members with the bed frame members 20 and superimposed box beams 200 at the time when the bed extension 22 is pivoted downwardly to a bale pick-up position.

On some occasions, it is desirable that the forwardly extending bale pick-up tines 110-116, provided in the earlier described embodiment as a portion of the lateral bale pick-up cradle assembly 96, not terminate or end in sharp points at their forward ends. This is because with some types of hay bales which are not tightly bound with twine, the pick-up tines may pass so close to the bale as to pass under the twine wrapped therearound, and thus cause breakage of the twine at such time as the bale is rolled over onto the bed of the truck. In the alternate embodiment of the invention shown in FIGS. 7-10, two pairs of pick-up fingers are provided, and are designated by reference numerals 250, 252 and 254, 256. It will be noted that the forward ends of the fingers 250 and 252 are interconnected by an arcuate bar 258, and that the forward ends of the fingers 254 and 256 are interconnected by an arcuate bar 260. The bars 258 and 260 prevent the fingers from passing into the hay bale at a location radially inwardly from the twine wrapped around and securing the bale. If either of the bars 258 or 260 encounter the twine, normally the twine will slip off these bars and underneath the pick-up fingers 250-256 so that there is no breakage of the twine at the time that the bale is rolled over onto the bed 16 of the truck.

It will also be noted in referring to FIG. 7 of the drawings that in the illustrated embodiment of the invention, the plate wings 142 and 144, previously described in referring to the embodiment illustrated in FIGS. 1-6, have been widened and, in the last described embodiment, are replaced by the wide plate wings 262 and 264. This construction facilitates better retention of loose hay which may be torn loose during the pulverizing and shredding operation, as well as during loading of hay bales utilizing the lateral bale pick-up cradle assembly 96.

The embodiment of the invention illustrated in FIGS. 7-10 operates, during usage, in substantially the same way as the embodiment shown in FIGS. 1-6 and hereinbefore described. It should be pointed out, however, that the conveyor structure utilized in the embodiment of the invention shown in FIGS. 7-10 provides the advantage of retaining the hay bale being moved onto the bed of the truck at an elevation such that there is no tendency of the central portion of the hay bale to contact, and be arrested in its movement by abutment against, one of the cross-frame members 34 and 266 utilized on the bed 16 and the bed extension 22, respectively. The cross-frame member 266 which is provided on the bed extension 22 for interconnecting the box beam frame members 39 is welded across the lower side of these box beam frame members so that it is disposed well below the location at which the upper runs 202a and 204a of the chains 202 and 204 are disposed.

From the foregoing description of the invention, it will be perceived that the hay loading, transporting and feeding system of the invention is a highly useful, relatively mechanically simple structure which has multiple uses and can be employed in a variety of ways for loading bales in the field, either from the side of a vehicle or at the rear thereof, and transporting them to a location for storage or feeding. Although a truck has been shown in the context of employment of the system of the invention, it has already been pointed out that it can be mounted upon a trailer which is towed by another vehicle. Moreover, although the hydraulic controls used for operating the several piston and cylinder assemblies of the invention, as well as the endless conveyor 40, are preferably located within the cab 12 of the truck 10, such controls can be located to the rear of the cab on the truck bed 16, or can be made self-contained on a trailer type vehicle where one is employed. Moreover, the controls employed can also be electro-hydraulic, in which electrical switches for actuating the system are provided in the cab 12, but direct power for operation of the various subsystems and subassemblies is provided by suitable hydraulic power fluid. Pneumatics can also be employed within the contemplation of the invention, and without departure from the principles here enunciated.

From the foregoing description of the invention and particularly of a preferred embodiment thereof, it will be perceived that various changes in the described structure and the principles of operation can be effected without departure from the most basic principles upon which the invention is bottomed. All changes and innovations of this type which continue to rely upon these basic principles are therefore deemed to be circumscribed by the spirit and scope of the invention, except as the same may be necessarily limited by the appended claims or reasonable equivalents thereof.

What is claimed is:

1. A vehicular system for loading, transporting and feeding baled hay comprising:
   an elongated bed having a forward end and a rear end;
   ground-engaging wheels supporting the bed;
   a rearwardly extending bed extension pivotally connected to the rear end of said bed for pivotal movement about a horizontal axis into a ramp-forming position;
   a bale moving conveyor, having a pair of parallel transversely spaced endless chains each having an upper run and a lower run, supported on said bed and said bed extension and each of said chains extending from the forward end of said bed to the rear end of said bed extension and including a portion movable with said bed extension during the pivotal movement thereof;
   bale-retaining fences disposed on opposite sides of said bed and bed extension;
   a lateral bale pick-up cradle assembly pivotally mounted on one side of said bed for pivotal movement about a horizontal axis from a vertically extending position upwardly from said one side of the bed to a position extending downwardly and outwardly from said one side of said bed; and
   a bale cutting and disintegrating assembly mounted on said bed at the forward end thereof for receiving a bale of hay moved forwardly on said conveyor.

2. A vehicular system as defined in claim 1 wherein said bale cutting and disintegrating assembly comprises:
   a housing mounted at the forward end of said bed and opening toward the rear of said bed;
   a plurality of cooperating grinding drums in said housing and exposed through the opening in said housing in a position to contact bales moved on said conveyor; and
   a horizontally extending cross-conveyor, including a first portion positioned below said drums and in said housing, and a second portion extending from said housing normal to said bed, said second portion being pivotable between a horizontally extending position in alignment with said first portion, and a vertically extending position projecting vertically from a side of said bed.

3. A vehicular system for loading, transporting and feeding baled hay as defined in claim 2 wherein said rearwardly extending bed extension includes:
   a pair of horizontally spaced, substantially parallel frame members each having an end pivotally connected to said bed;
   a slide shoe supported on the rear of said frame member; and
   rollers supported on said slide shoe.

4. A vehicular system for loading, transporting and feeding baled hay as defined in claim 1 wherein said rearwardly extending bed extension includes
   a pair of horizontally spaced, substantially parallel frame members each having an end pivotally connected to said bed;
   a slide shoe supported on the rear of said frame member; and
   rollers supported on said slide shoe.

5. A vehicular system for loading, transporting and feeding baled hay as defined in claim 1 wherein said lateral bale pick-up cradle assembly comprises:
   an angulated arm having one end pivotally connected to said bed and including a central arm segment and an outer arm segment extending at an obtuse angle from said central arm segment;
   a plurality of elongated, forwardly extending spaced bale pick-up tines secured to and projecting forwardly from said angulated arm toward the forward end of said bed; and
   means for pivoting said angulated arm from an upwardly extending first position alongside said bed and in general alignment with one of said bale-retaining fences, to a horizontally extending position in which said central arm segment extends outwardly from the bed and substantially horizontally, and the tines are spaced from picking up a bale on the ground alongside said bed.

6. A vehicular system for loading, transporting and feeding baled hay as defined in claim 1 wherein said rearwardly extending bed extension comprises:
   a pair of spaced, parallel box beam frame members each having a forward end and a rear end and each supporting and guiding the portion of said conveyor movable with the bed extension; and
   a curved runner plate secured to the rear end of each of said box beam frame members for sliding contact with the ground when the bed extension is pivoted into a ramp forming position.

7. A hay loading, transporting and feeding truck comprising:
   a bed having a forward end and a rear end;
   a cab ahead of said bed;
   a bale cutting and disintegrating assembly positioned between said bed and cab for receiving hay from said bed;
   a conveyor mounted on said bed and extending between the forward and rear ends thereof for moving bales of hay forward on the bed into the cutting and disintegrating assembly;
   a cross-conveyor mounted under said bale cutting and disintegrating assembly for transferring cut hay to the side of said truck to windrow it on the ground for feeding purposes; and
   a reciprocating, foldable pusher plate assembly mounted on said bed for pushing bales into said bale cutting and disintegrating assembly in cooperative action with said conveyor.

8. A hay loading, transporting and feeding truck as defined in claim 7 and further characterized as including fence means projecting upwardly and outwardly from opposite sides of said bed for retaining hay bales on said bed.

9. A hay loading, transporting and feeding truck as defined in claim 7 and further characterized as including means for picking up a hay bale from alongside said bed and positioning said bale on the bed between said pusher plate assembly and said cutting and disintegrating assembly.

10. A hay loading, transporting and feeding truck as defined in claim 9 which further comprises:
fence means projecting upwardly and outwardly from opposite sides of said bed for retaining hay bales on said bed;
and wherein said means for picking up a hay bale from alongside said bed comprises:
an angulated arm having one end pivotally connected to said bed and including a central arm segment and an outer arm segment extending at an obtuse angle from said central arm segment;
a plurality of elongated, forwardly extending spaced bale pick-up tines secured to and projecting forwardly from said angulated arm toward the forward end of said bed; and
means for pivoting said angulated arm from an upwardly extending first position alongside said bed and in general alignment with one of said bale-retaining fences, to a horizontally extending position in which said central arm segment extends outwardly from the bed and substantially horizontally, and the tines are spaced for picking up a bale on the ground alongside said bed.

11. A hay loading, transporting and feeding truck as defined in claim 7 wherein said bale cutting and disintegrating assembly comprises:
a plurality of cooperating grinding drums mounted for rotation about horizontal axes and extending transversely across said bed at the forward end thereof.

12. A hay loading, transporting and feeding truck as defined in claim 7 and further characterized as including a rearwardly extending bed extension pivotally connected to the rear end of said bed for pivotal movement between a horizontal position and a downwardly extending ramp forming position.

13. A hay loading, transporting and feeding truck as defined in claim 12 wherein said conveyor comprises:
a first pair of parallel, spaced box beams mounted on said bed and projecting longitudinally along the bed, each of said box beams having an upper side and a lower side;
a pair of parallel, spaced second box beams in said bed extension longitudinally aligned with said first pair of box beams, said second box beams each having an upper side and a lower side;
a pair of parallel endless chains each having:
an upper run extending along and supported by the upper sides of one of said first box beams and an aligned one of said second box beams; and
a lower run extending within one of said first box beams and an aligned one of said second box beams; and
sprockets engaging each of said chains.

14. A hay loading, transporting and feeding truck as defined in claim 13 and further characterized as including fence means projecting upwardly and outwardly from opposite sides of said bed for retaining hay bales on said bed.

15. A hay loading, transporting and feeding truck as defined in claim 14 and further characterized as including means for picking up a hay bale from alongside said bed and positioning said bale on the bed between said pusher plate assembly and said cutting and disintegrating assembly.

16. A hay handling system comprising:
an elongated bed having a front end and a rear end;
a reversibly movable conveyor mounted on said bed for moving hay forwardly and rearwardly on the bed;
ground-engaging wheels supporting the bed;
means on the rear end of the bed for scooping up a hay bale to the rear of the bed, and loading it on the rear end portion of said bed;
means mounted on the side of the bed adjacent the forward end thereof for picking up a hay bale located alongside said bed and loading it on the front end portion of said bed, whereby said bale loading means and reversibly moving conveyor can be cooperatively used to completely load said bed with hay;
a pusher plate reciprocably and foldably mounted on said bed for folding between a first position extending along one side of the bed and a second position extending transversely of the bed, for reciprocating movement longitudinally of the bed; and
means cooperating with said pusher plate to cut up a bale of hay.

17. A hay handling system as defined in claim 16 wherein said scooping up means comprises downwardly inclined ramp means at the rear of said bed.

18. A vehicular system for loading, transporting and feeding baled hay comprising:
an elongated bed having a forward end and a rear end;
ground-engaging wheels supporting the bed;
a rearwardly extending bed extension pivotally connected to the rear end of said bed for pivotal movement about a horizontal axis into a ramp-forming position;
a bale moving conveyor having a pair of parallel transversely spaced endless chains each having an upper run and a lower run and each having a plurality of spaced tines projecting from each of said chains, said conveyor being supported on said bed and said bed extension and each of said chains extending from the forward end of said bed to the rear end of said bed extension and including a portion movable with said bed extension during the pivotal movement thereof;
said bale moving conveyor further comprising:
longitudinally spaced plates mounted on opposite sides of said bed and bed extension, and supporting portions of the upper runs of said chains;
a first set of sprockets positioned in the spaces between pairs of said longitudinally spaced plates and engaging the upper runs of said chains at a location adjacent the rear end of said bed and adjacent the junction between said bed and bed extension;
a second set of spaced sprockets engaging the upper side of the lower runs of said chains; and
slotted channel members slidingly receiving the lower runs of said chains at a location adjacent the junction between said bed and said bed extension for guiding the lower runs of said chains from said bed to said bed extension, and each including a slot extending the length thereof facilitating the passage of said tines through said channel members by extension through said slots;

bale-retaining fences disposed on opposite sides of said bed and said bed extension;

a lateral bale pickup cradle assembly pivotally mounted on one side of said bed for pivotal movement about a horizontal axis from a vertically extending position upwardly from one side of the bed to a position extending downwardly and outwardly from one side of said bed; and a bale cutting and disintegrating assembly mounted on said bed at the forward end thereof for receiving a bale of hay moved forwardly on said conveyor.

19. A vehicular system for loading, transporting and feeding baled hay comprising:

an elongated bed having a forward end and a rear end;

ground engaging wheels supporting the bed;

a rearwardly extending bed extension pivotally connected to the rear end of said bed for pivotal movement about a horizontal axis into a ramp-forming position;

a bale moving conveyor having a pair of parallel, transversely spaced endless chains each having an upper run and a lower run and each having a plurality of spaced tines projecting from each of said chains, said conveyor being supported on said bed and said bed extension, and each of said chains extending from the forward end of said bed to the rear end of said bed extension, and including a portion movable with said bed extension during the pivotal movement thereof;

said bale moving conveyor further comprising:

a first pair of parallel, spaced box beams mounted on said bed and projecting longitudinally along the bed, each of said box beams having an upper side and a lower side;

a pair of parallel, spaced second box beams in said bed extension and logitudinally aligned with said first pair of box beams, said second box beams each having an upper side and a lower side;

sprockets engaging each of said chains;

and wherein said pair of parallel endless chains is further characterized as including:

an upper run extending along and supported by the upper sides of one of said first box beams and of an aligned one of said second box beams; and a lower run extending within one of said first box beams and an aligned one of said second box beams;

bale-retaining fences disposed on opposite sides of said bed and bed extension;

a lateral bale pickup cradle assembly pivotally mounted on one side of said bed for pivotal movement about a horizontal axis from a vertically extending position upwardly from one side of the bed to a position extending downwardly and outwardly from one side of said bed; and a bale cutting and disintegrating assembly mounted on said bed at the forward end thereof for receiving a bale of hay moving forwardly on said conveyor.

20. A vehicular system for loading, transporting and feeding baled hay as defined in claim 19 and further characterized as including a rod secured within each of said box beams on the top of the bottom side thereof and guiding and supporting the lower run of one of said chains extending therethrough.

21. A vehicular system as defined in claim 19 wherein said bale cutting and disintegrating assembly is further characterized in comprising:

a housing mounted at the forward end of said bed and opening toward the rear of said bed;

a plurality of cooperating grinding drums in said housing and exposed through the opening of said housing in a position to contact bales moving on said conveyor;

a horizontally extending cross conveyor including a first portion positioned below said drums and in said housing, and a second portion extending from said housing normal to said bed, said second portion being pivotable between a horizontally extending position in alignment with said first portion, and a vertically extending position projecting vertically from a side of said bed.

22. A vehicular system for loading, transporting and feeding baled hay comprising:

an elongated bed having a forward end and a rear end;

ground engaging wheels supporting the bed;

a rearwardly extending bed extension pivotally connected to the rear end of said bed for pivotal movement about a horizontal axis into a ramp-forming position;

a bale moving conveyor having a pair of parallel transversely spaced endless chains each having an upper run and a lower run, supported on said bed and said bed extension, and extending from the forward end of said bed to the rear end of said bed extension, and including a portion movable with said bed extension during the pivotal movement thereof;

bale-retaining fences disposed on opposite sides of said bed and bed extension;

a lateral bale pickup cradle assembly pivotally mounted on one side of said bed for pivotal movement about a horizontal axis from a vertically extending position upwardly from said one side of the bed to a position extending downwardly and outwardly from said one side of said bed, said lateral bale pickup cradle assembly comprising:

an angulated arm having one end pivotally connected to said bed and including a central arm segment and an outer arm segment extending at an obtuse angle from said central arm segment;

a plurality of elongated, forwardly extending, spaced bale pickup tines secured to, and projecting forwardly from, said angulated arm toward the forward end of said bed;

bars interconnecting the forward ends of said tines for preventing breakage of twine wrappings on hay bales; and means for pivoting said angulated arm from an upwardly extending first position alongside said bed and in general alignment with one of said bale-retaining fences, to a generally horizontally extending position in which said central arm segment extends outwardly from the bed and substantially horizontally, and the tines are spaced for picking up a bale on the ground alongside said bed;

a bale cutting and disintegrating assembly mounted on said bed at the forward end thereof for receiving a bale of hay moving forwardly on said conveyor.

23. A vehicular system for loading, transporting and feeding baled hay comprising:
- an elongated bed having a forward end and a rear end;
- ground-engaging wheels supporting the bed;
- a rearwardly extending bed extension pivotally connected to the rear end of said bed for pivotal movement about a horizontal axis into a ramp-forming position;
- a bale moving conveyor having a pair of parallel transversely spaced endless chains each having an upper run and a lower run supported on said bed and said bed extension and extending from the forward end of said bed to the rearward end of said bed extension, said conveyor including a portion movable with said bed extension during the pivotal movement thereof, said bale moving conveyor further comprising:
  - a plurality of tines on each of said endless chains with said tines being secured on opposite sides of each of said chains in alternating sequence;
  - a first pair of parallel, spaced box beams mounted on said bed and projecting longitudinally along the bed, each of said box beams having an upper side and a lower side;
  - a pair of parallel, spaced second box beams mounted on said bed extension and longitudinally aligned with said first pair of box beams, said second box beams each having an upper side and a lower side;
  - rod means secured to each of said box beams and straddled by a plurality of tines for guiding said chains during their movment;
  - sprockets engaging each of said chains;
  - and wherein said pair of endless chains is further characterized as having:
    - an upper run extending along and supported by the upper sides of one of said first box beams and an aligned one of said second box beams; and
    - a lower run extending within one of said first box beams and an aligned one of said second box beams and carrying said plurality of tines straddling said rod means;
- bale-retaining fences disposed on opposite sides of said bed and said bed extension;
- a lateral bale pickup cradle assembly pivotally mounted on one side of said bed for pivotal movement about a horizontal axis from a vertically extending position upwardly from said one side of the bed to a position extending downwardly and outwardly from said one side of said bed, said lateral bale pickup cradle assembly further comprising:
  - an angulated arm having one end pivotally connected to said bed and including a central segment and an outer arm segment extending at an obtuse angle from said central arm segment;
  - a plurality of elongated, forwardly extending spaced bale pickup tines secured to and projecting forwardly from said angulated arm toward the forward end of said bed; and
  - bars interconnecting the forward ends of said pickup tines for preventing breaking of twine wrappings on hay bales; and
- a bale cutting and disintegrating assembly mounted on said bed at the forward end thereof for receiving a bale of hay moving forwardly on said conveyor, said bale cutting and disintegrating assembly comprising:
  - a housing mounted at the forward end of said bed and opening toward the rear of said bed;
  - a plurality of cooperating grinding drums in said housing and exposed through the opening in said housing in a position to contact bales moving on said conveyor; and
  - a horizontally extending cross conveyor including a first portion positioned below said drums and in said housing, and a second portion extending from said housing normal to said bed, said second portion being pivotally movable between a horizontally extending position in alignment with said first portion, and a vertically extending position projecting vertically from a side of said bed.

24. A vehicular system for loading, transporting and feeding baled hay as defined in claim 23 wherein said rearwardly extending bed extension comprises:
- a pair of spaced, parallel box beam frame members each having a forward end and a rear end and each supporting and guiding the portion of said conveyor movable with the bed extension; and
- a curved runner plate secured to the rear end of each of said box beam frame members for sliding contact with the ground when the bed extension is pivoted into a ramp forming position.

25. A vehicular system for loading, transporting and feeding baled hay as defined in claim 24 wherein one of said sprockets is carried in the rear end of each of said box beam frame members.

26. A vehicular system for loading, transporting and feeding baled hay comprising:
- an elongated bed having a forward end and a rear end;
- ground-engaging wheels supporting the bed;
- a rearwardly extending bed extension pivotally connected to the rear end of said bed for pivotal movement about a horizontal axis into a ramp-forming position;
- a bale moving conveyor, having a pair of parallel transversely spaced endless chains, each having an upper run and a lower run, supported on said bed and said bed extension and extending from the forward end of said bed to the rear end of said bed extension, and including a portion movable with said bed extension during the pivotal movement thereof;
- bale-retaining fences disposed on opposite sides of said bed and bed extension;
- a lateral bale pickup cradle assembly pivotally mounted on one side of said bed for pivotal movement about a horizontal axis from a vertically extending position upwardly from said one side of the bed to a position extending downwardly and outwardly from said one side of said bed, said lateral bale pickup cradle assembly comprising:
  - an angulated arm having one end pivotally connected to said bed and including a central arm segment and an outer arm segment extending at an obtuse angle from said central arm segment;
  - a plurality of elongated, forwardly extending spaced bale pickup tines secured to and projecting forwardly from said angulated arm toward the forward end of said bed;

bars interconnecting the forward ends of said tines for preventing breaking of twine wrappings on said hay bales; and means for pivoting said angulated arm from an upwardly extending first position alongside said bed and in general alignment with one of said bale-retaining fences, to a horizontally extending position in which said central arm segment extends outwardly from the bed and substantially horizontally, and the tines are spaced for picking up a bale on the ground alongside said bed; and a bale cutting and disintegrating assembly mounted on said bed at the forward end thereof for receiving a bale of hay moving forwardly on said conveyor, said bale cutting and disintegrating assembly comprising:

a housing mounted at the forward end of said bed and opening toward the rear of said bed;

a plurality of cooperaing grinding drums in said housing and exposed through the opening in said housing in a position to contact bales moving on said conveyor; and a horizontally extending cross-conveyor, including a first portion positioned below said drums and in said housing, and a second portion extending from said housing normal to said bed.

27. A vehicular system for loading, transporting and feeding baled hay comprising:

an elongated bed having a forward end and a rear end;

ground-engaging wheels supporting the bed;

a rearwardly extending bed extension connected to the rear end of said bed for pivotal movement about a horizontal axis into a ramp-forming position, said rearwardly extending bed extension including:

a pair of horizontally spaced, substantially parallel frame members each having an end pivotally connected to said bed and having a rear end;

a slide shoe supported on the rear ends of said frame members; and rollers supported on said slide shoe;

a bale moving conveyor, having a pair of parallel transversely spaced endless chains each having an upper run and a lower run, supported on said bed and said bed extension, and extending from the forward end of said bed to the rear end of said bed extension, said conveyor including a portion movable with said bed extension during the pivotal movement thereof, said bale moving conveyor further comprising:

a plurality of spaced tines projecting from each of said chains;

longitudinally spaced plates mounted on opposite sides of said bed and bed extension, and supporting portions of the upper runs of said chains;

a first set of sprockets including sprockets positioned in the spaces between pairs of said longitudinally spaced plates and engaging the upper runs of said chains;

a second set of spaced sprockets engaging the upper side of the lower runs of said chains; and slotted channel members slidingly receiving the lower runs of said chains for guiding the lower runs of said chains between said bed and said bed extension, and each including a slot extending the length thereof facilitating the passage of said tines through said channel members by extension through said slots;

bale retaining fences disposed on opposite sides of said bed extension;

a lateral bale pickup cradle assembly pivotally mounted on one side of said bed for pivotal movement about a horizontal axis from a vertically extending position upwardly from said one side of the bed to a position extending downwardly and outwardly from said one side of said bed, said lateral bale pickup cradle assembly comprising:

an angulated arm having one end pivotally connected to said bed and including a central arm segment and an outer arm segment extending at an obtuse angle from said central arm segment;

a plurality of elongated, forwardly extending spaced bale pickup tines secured to and projecting forwardly from said angulated arm toward the forward end of said bed; and means for pivoting said angulated arm from an upwardly extending first position alongside said bed and in general alignment with one of said bale-retaining fences, to a horizontally extending position in which said central arm segment extends outwardly from the bed and substantially horizontally, and the tines are spaced for picking up a bale on the ground alongside said bed;

a bale cutting and disintegrating assembly mounted on said bed at the forward end thereof for receiving a bale of hay moved forwardly on said conveyor, said bale cutting and disintegrating assembly comprising:

a housing mounted at the forward end of said bed and opening toward the rear of said bed;

a plurality of cooperating grinding drums in said housing and exposed through the opening of said housing in a position to contact bales moved on said conveyor; and a horizontally extending cross-conveyor including a first portion positioned below said drums and in said housing, and a second portion extending from said housing normal to said bed, said second portion being pivotable between a horizontally extending position in alignment with said first portion, and a vertically extending position projecting vertically from a side of said bed; and a reciprocating pusher plate assembly mounted on said bed for pushing said bales into said bale cutting and disintegrating assembly.

* * * * *